United States Patent
Coast (12)

(10) Patent No.: US 10,759,505 B1
(45) Date of Patent: Sep. 1, 2020

(54) CRAYFISH/CRAWFISH HARVESTING METHOD AND APPARATUS

(71) Applicant: John B. Coast, Baton Rouge, LA (US)

(72) Inventor: John B. Coast, Baton Rouge, LA (US)

( * ) Notice: Subject to any disclaimer, the term of this patent is extended or adjusted under 35 U.S.C. 154(b) by 298 days.

(21) Appl. No.: 15/876,663

(22) Filed: Jan. 22, 2018

Related U.S. Application Data (60) Provisional application No. 62/448,626, filed on Jan. 20, 2017.

(51) Int. Cl.
*B60F 3/00* (2006.01)
*B63B 35/14* (2006.01)
*B62D 55/084* (2006.01)

(52) U.S. Cl.
CPC ............ *B63B 35/14* (2013.01); *B62D 55/084* (2013.01)

(58) Field of Classification Search
CPC .............................. B63B 35/14; B62D 55/084
USPC ........................................................ 180/9.1
See application file for complete search history.

(56) References Cited

U.S. PATENT DOCUMENTS

| | | | | | |
|---|---|---|---|---|---|
| 3,165,364 | A | * | 1/1965 | Hardman | B62D 55/096 305/112 |
| 3,412,821 | A | * | 11/1968 | Humphrey | B62K 13/00 180/9.64 |
| 3,473,619 | A | * | 10/1969 | Dion | B62D 55/0655 180/9.44 |
| 4,253,536 | A | * | 3/1981 | Braathen | A01G 23/006 180/9.5 |
| 4,817,553 | A | | 4/1989 | Knott, Sr. | |
| 4,934,300 | A | * | 6/1990 | Seligman | B60F 3/0015 440/12.56 |
| 4,953,647 | A | * | 9/1990 | Leboime | B62D 11/10 180/9.1 |
| 6,203,127 | B1 | * | 3/2001 | Chapman | B62D 55/04 305/114 |
| 6,478,389 | B2 | * | 11/2002 | Doyle | B62D 55/04 305/187 |
| 7,644,788 | B2 | * | 1/2010 | Scheetz | B62D 55/112 180/9.5 |
| 2009/0124143 | A1 | * | 5/2009 | Kanerva | B60F 3/0015 440/12.63 |
| 2014/0158440 | A1 | * | 6/2014 | Haar | B62D 55/04 180/9.21 |
| 2014/0251767 | A1 | * | 9/2014 | Cleaves | B65G 17/22 198/850 |

OTHER PUBLICATIONS

Venable Fabricators (http://venablefabricators.com/Venable_Fabricators/products/crawfish-boat/).
Hughes Welding (www.hugeswelding.com/aquaculture).

* cited by examiner

*Primary Examiner* — Jacob D Knutson
(74) *Attorney, Agent, or Firm* — Garvey, Smith & Nehrbass, Patent Attorneys, L.L.C.; Charles C. Garvey, Jr.; Vanessa M. D'Souza (57) ABSTRACT

A crayfish or crawfish harvesting apparatus employs an improved drive that uses hydraulic wheels (e.g., rubber tired wheels) encircled by one or more endless belts. One or more hydraulic motor drives can be used to drive the wheels. Lugs or guide lugs are placed on opposing sides of each wheel and are preferably connected to the belt. Fasteners (e.g., bolts or rivets) attach cleats (e.g., steel u-shaped channel cleats) to the belts and lugs.

19 Claims, 14 Drawing Sheets

CRAYFISH/CRAWFISH HARVESTING METHOD AND APPARATUS

CROSS-REFERENCE TO RELATED APPLICATIONS

This application claims benefit of U.S. Provisional Patent Application Ser. No. 62/448,626, filed 20 Jan. 2017, which is hereby incorporated herein by reference.

Priority of U.S. Provisional Patent Application Ser. No. 62/448,626, filed 20 Jan. 2017, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention is directed to a crayfish or crawfish harvesting apparatus having an improved track system that is simple, rugged, durable, economical and able to withstand a wet, abrasive crayfish/crawfish pond or rice field environment and to solve a rutting problem caused by prior art wheel driven mechanisms. The present invention provides a crayfish/crawfish harvesting apparatus having a hydraulic drive track system mounted on a long arm (beam) which attaches to one end of an aluminum boat. The prior art bladed wheel is replaced by the improved arrangement of the present invention.

2. General Background of the Invention

The cultivating and harvesting of crayfish or crawfish has developed over many years into a large commercial industry, particularly in the rice farms of South Louisiana and Texas. Farmers produce rice and crayfish (*Procambarus clarkii*) or crawfish in the same flooded fields or ponds. When the rice is harvested, the crayfish or crawfish feed on the rice stubble.

Crawfish/crayfish are caught in small traps that are placed in the rice fields. These traps are normally placed in long rows with the traps spaced about fifty (50) feet apart. The traps are baited with fish or a commercially produced bait. The most common method of harvesting the traps employs an aluminum boat driven by a powered wheel located on the front or rear of the boat. An example can be seen in U.S. Pat. No. 4,817,553. The single wheel is mounted on a long arm which attaches to the boat. This arm can be raised or lowered by means of a hydraulic cylinder. Steering of the boat is accomplished by rotating the wheel on a vertical axis or by moving the arm sideways in relation to the boat. Small gasoline engines mounted in the boat drive a hydraulic pump to actuate the hydraulic cylinders and the drive motor located on the drive wheel. Hydraulic valves placed near an operator allows the operator to control the various functions. Crayfish or crawfish boats of this type are very common and produced by a number of manufacturers such as Venable Fabricators (www.venablefabricators.com) and Hughes Welding (www.hugheswelding.com/aquaculture). Millions of pounds of crawfish are harvested each year using such harvesting boats.

The wheel used to drive the boats is approximately forty-two inches (42") in diameter and has large blades on the outer diameter to produce traction in the soft mud. The wheels can vary in diameter and width, but a forty-two inch (42") diameter by sixteen inches (16") wide is common. Blade length, shape, and spacing can vary from manufacturer to manufacturer.

3. General Discussion of the Present Invention

The present invention provides an improved crayfish/crawfish harvesting apparatus having two wheels (e.g., rubber tired) preferably with an endless track or tracks (e.g., rubber) around the wheels. In the preferred embodiment the track can include one or two endless belts, cleats, drive lugs, and bolted connections that secure the cleats and drive lugs to the belt or belts.

The belt can be composed of a heavy duty single or multi-ply piece of conveyor belting. Metal, rubber, or plastic track guides on each side of the wheels maintain alignment of track and wheels. A metal or plastic cleat on the outside of the belt provides lateral (crosswise) strength and traction for the belt and harvesting apparatus. The cleats (e.g., metal) are fastened or bolted to the belt with bolts that go through the cleat, the belt, into the track guides. The track guides can be steel, rubber, plastic, urethane or any suitable material which can handle wear and be capable of attachment to the belt and cleats with bolts, fasteners or rivets. When one belt is used, the wheels friction drive the belt. In one embodiment, the wheels friction drive the cleats 27 (e.g., in FIG. 3 where two belts are used).

One wheel is preferably adjustable (to change distance between the wheels) to provide track tension either by adjustment bolts or with a hydraulic cylinder pressured with fluid such as grease or oil. Each wheel is preferably driven by a low speed high torque motor (e.g., hydraulic). Each motor is preferably attached to a frame system which also mounts to the long arm mounted off either end of the boat. The wheels can be rubber tires such as those used on skid steer loaders. In one embodiment, both wheels are each preferably attached to the output shaft of a hydraulic drive motor. In another embodiment, one wheel can be driven, the other wheel can be an idler wheel. The motors to be used are designed as wheel motors capable of carrying very large radial loads. The motor drives each have seal designs capable of operating in the wet abrasive environment of a rice field. This design enables elimination of sprockets and bogey wheels. The only bearings are the bearings in the drive motors. There are preferably only two seals required for the entire track system. A suitable drive motor can be a Model DT (740 Series) sold by White Drive Products.

Another feature of the present invention is two speed capability. The two drive motors can be run in a parallel circuit for low speed high torque and then shift into a series circuit to double the speed. This feature is advantageous as it allows running in high speed when running or harvesting traps and shifting into low speed to push over obstacles such as levees, or to plow through thick mud or to travel on dry roads.

BRIEF SUMMARY OF THE INVENTION

The apparatus of the present invention solves the problems confronted in the art in a simple and straightforward manner. The problem with prior art single wheel driven boats is that repeated running along a line of traps placed in the rice ponds creates a deep rut or ditch in the field. This problem is severe and expensive for the rice farmers to repair. They must fill the ditches left by the single wheel once the fields are drained at the end of crawfish season.

In the past few years a number of farmers and companies have been experimenting with rubber tracks in place of the wheels. The tracks are reducing the rutting problem. However, tracks that have been tried have been inherently more complex than a wheel. These experimental track units have used bogey wheels, drive sprockets, and multiple shafts and bearings that must be sealed to keep water and mud out.

Some prior art crawfish/crayfish harvesting machines use a drive wheel that is running in shallow water (e.g., one to two feet deep) in a muddy and very abrasive environment.

Track systems designed for snow applications have been tried, but water and silt gets into the rollers and destroys the bearings. In addition, light weight snowmobile tracks have not held up to the rigorous application of crayfish or crawfish farming.

The present invention includes a crayfish/crawfish harvesting apparatus. The invention includes a floating hull, a track frame, a connector that joins the track frame to the hull. First and second drive wheels are preferably attached to the track frame. Each drive wheel preferably has an outer belt engaging surface. An endless belt (or two endless belts in one embodiment) preferably encircles the drive wheels, engaging the belt engaging surface of both said drive wheels. When two belts are used, the wheels engage the cleats. A belt tensioner preferably urges the wheels apart so that the wheels frictionally engage the belt. A first drive motor can have a first drive shaft that is preferably connected to the first wheel. A second drive motor can have a second drive shaft that is preferably connected to the second wheel. Lugs can preferably maintain alignment of the track or tracks on the wheels. Cleats can be fastened to the belt using bolted or like connections.

In one embodiment, the endless belt (or belts) can encircle the wheels to follow an oval.

In one embodiment, each said cleat can be fastened to the belt and to multiple said lugs.

In one embodiment, each said cleat can be fastened to one said lug on one side of a wheel and to another said lug on the opposite side of the wheel.

In one embodiment, each said cleat can be attached to both the endless belt and a said lug using a fastener that contacts the cleat, the endless belt and the lug.

In one embodiment, each said motor can be hydraulically powered.

In one embodiment only one wheel is driven with an hydraulic motor, the other wheel being an idler and having an idler bearing instead of an hydraulic motor.

In one embodiment, each said drive motor can be mounted to the track frame.

In one embodiment, each said drive wheel can have a generally cylindrically shaped outer belt engaging surface.

In one embodiment, the belt tensioner can include an extendable hydraulic cylinder.

In one embodiment, the belt tensioner can include adjustment bolts that can be rotated to vary the distance between the drive wheels.

The present invention preferably includes a floating hull, a track frame and a connector that joins the track frame to the hull. First and second drive wheels can be driven by first and second drive motors, said motors can be attached to the track frame and each having a drive shaft attached to a said drive wheel. Each said drive wheel can have an outer belt engaging surface. An endless belt can encircle the drive wheels, engaging the belt engaging surface of both said drive wheels. In one embodiment, two spaced apart endless belts are used wherein the wheels engage the cleats. A belt tensioner can urge the wheels apart so that the wheels frictionally engage the endless belt. Lugs can maintain alignment of the track frame on the wheels. Cleats can be fastened to the belt.

The present invention includes a crayfish/crawfish harvesting apparatus. The invention includes a floating hull, a track frame, a connector that joins the track frame to the hull. First and second wheels are preferably attached to the track frame. Each wheel preferably has an outer belt engaging surface. One or more endless belts (or two endless belts in one embodiment) preferably encircles the wheels, engaging the belt engaging surface of both the wheels. A belt tensioner preferably urges the wheels apart so that the wheels engage the belt. First and second drive motors preferably mounted on the track frame, the first drive motor preferably driving the first wheel, the second drive motor preferably driving the second wheel. Lugs can preferably maintain alignment of the track or tracks on the wheels. Cleats can be fastened to the belt using bolted or like connections.

In one embodiment, a controller preferably enables the forward speed be doubled.

In one embodiment, the hull preferably supports a high flow pump and a low flow pump and further comprises a control valve that preferably enables selective transmission of hydraulic fluid from the high flow pump to: both first and second drive motors in parallel, or to the first drive motor and then to the second drive motor in series.

In one embodiment, one of the wheels can be driven by one drive motor and further comprising an idler bearing on the frame that supports the other wheel.

In one embodiment, one or both wheels can have drive lugs, each drive lug can be positioned in between two adjacent cleats.

In one embodiment, the endless belt can have two belt ends and a seam wherein the belt ends abut, and wherein the cleats preferably attach to the endless belt with three pairs of openings and three pairs of bolted connections.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
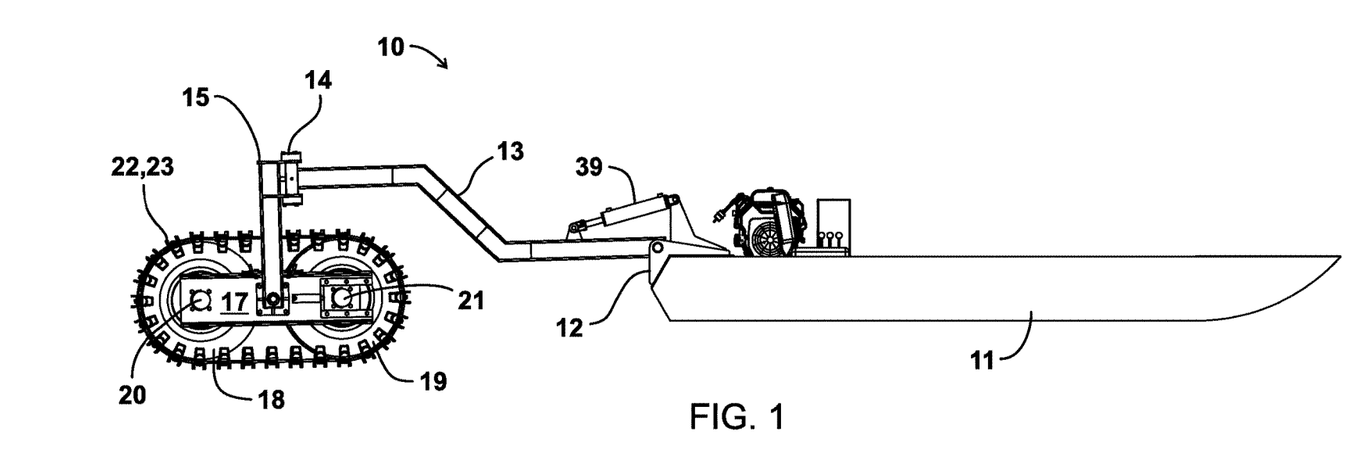
FIG. 1 is a side view of a preferred embodiment of the present invention.
Figure 2:
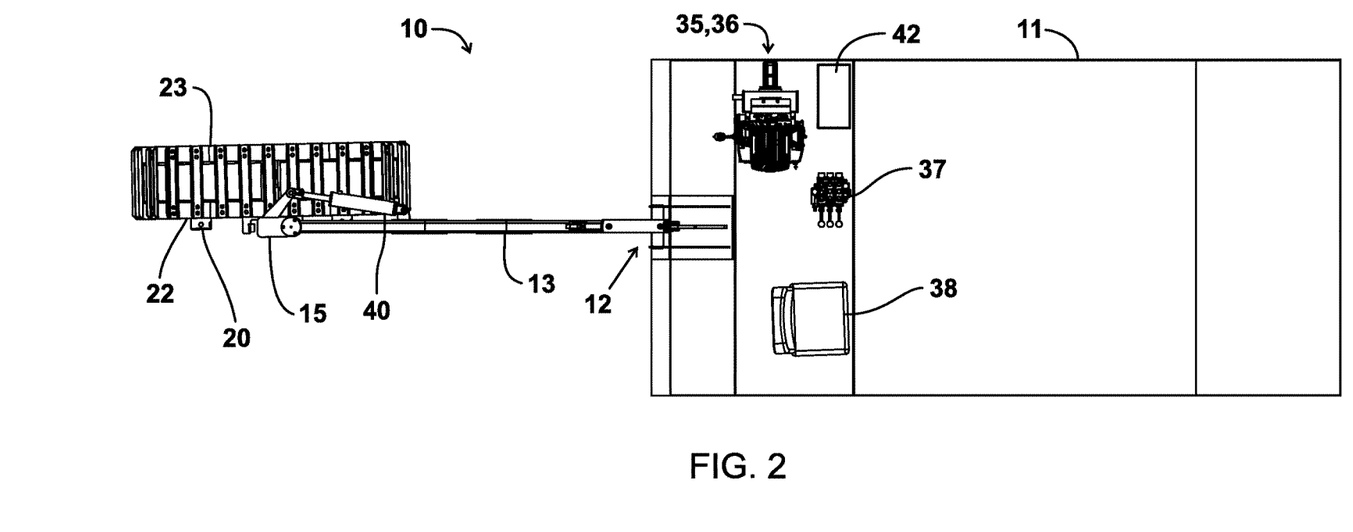
FIG. 2 is a top view of a preferred embodiment of the apparatus of the present invention.
Figure 3:
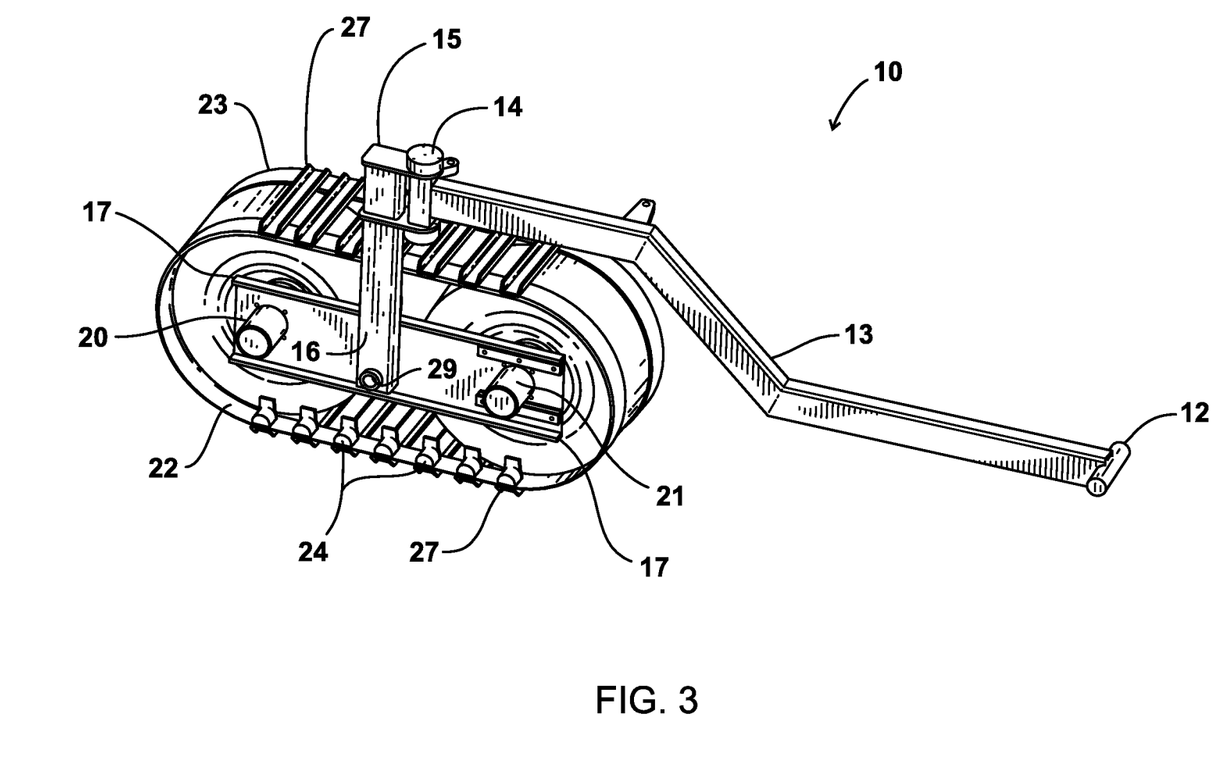
FIG. 3 is a partial perspective view of a preferred embodiment of the apparatus of the present invention.
Figure 4:
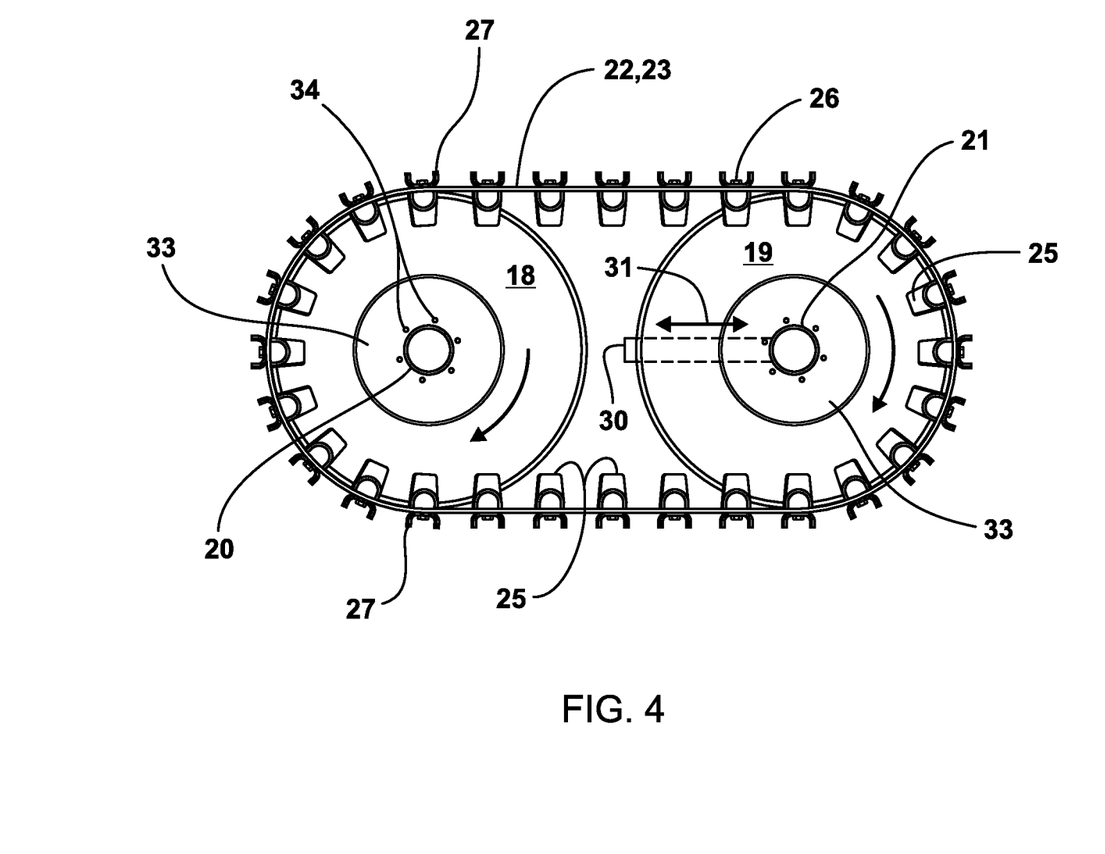
FIG. 4 is a partial side view of a preferred embodiment of the apparatus of the present invention.

FIGS. 1-21 show a preferred embodiment of the apparatus of the present invention designated generally by the numeral 10 in FIGS. 1-3. Crawfish or crayfish harvesting apparatus 10 employs a boat, hull, or float 11 such as a commercially available aluminum boat. Arm 13 is preferably connected to boat 11 at connecting portion 12. The arm 13 and its attached frame 15 pull or push the boat 11 with drive wheels 18, 19, belts or tracks or endless belts 22, 23 and drive motors 20, 21. Hull or boat 11 has a driver or operator's seat 38. Hull 11 supports a power unit or engine 36 coupled to a hydraulic pump 35 (with reservoir 42) used to operate the hydraulic drive motors 20, 21, lift cylinder 39, and hydraulic steer cylinder 40. All hydraulic components can be controlled with hydraulic control valve 37.

Arm 13 preferably attaches to frame 15 with a connection or bearing or pivot 14. Frame 15 includes a post or vertical section 16 and a horizontally extending frame section 17 which provides an opening and bolt hole openings for attachment of a motor mount plate 51 which is a non-rotating part of motor bearing housing 28. A bearing or pivot assembly at 29 preferably forms an interface between post/vertical frame section 16 and generally horizontally extending frame section 17. The bearing or pivot assembly can include pivot plate 47 with tubular member 49 having bore 50 that is receptive of pivot shaft 61 mounted on the bottom of vertical frame section 16. Pivot plate 47 can have gusset/stiffener plates 48 as shown in FIG. 10.

Figure 7:
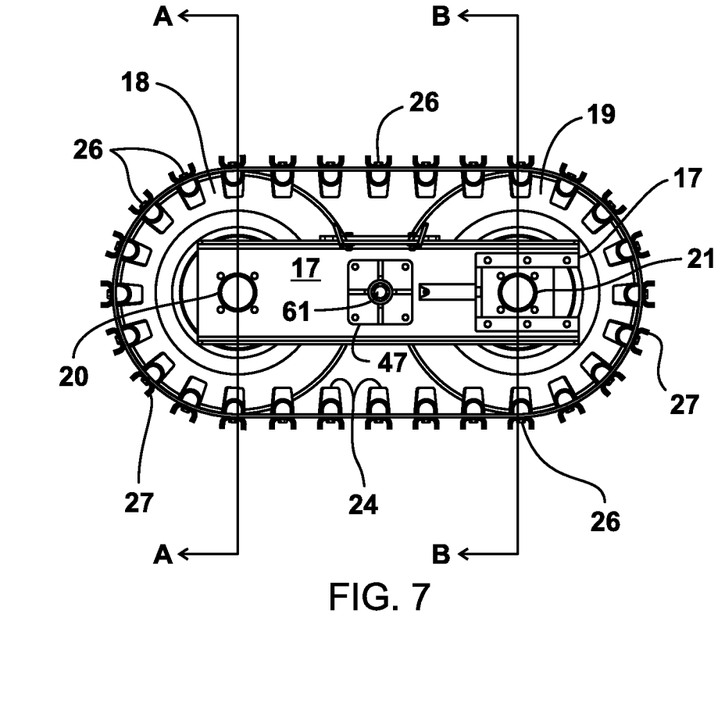
FIG. 7 is a partial side view of a preferred embodiment of the apparatus of the present invention.
Figure 8:
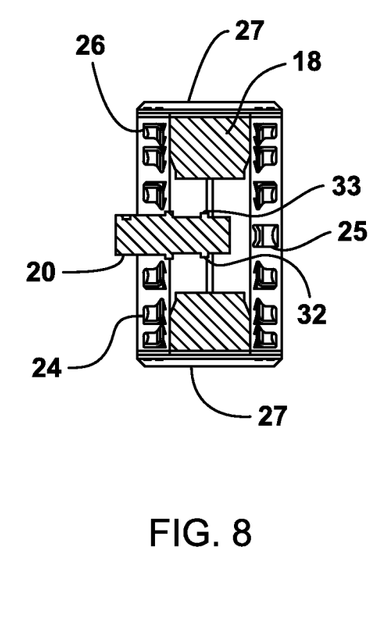
FIG. 8 is a fragmentary view of a preferred embodiment of the apparatus of the present invention taken along lines A-A of FIG. 7.
Figure 9:
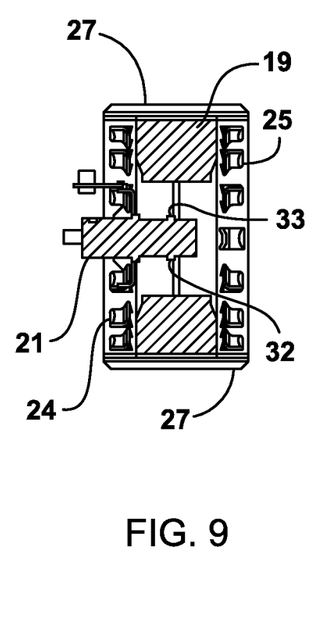
FIG. 9 is a fragmentary view of a preferred embodiment of the apparatus of the present invention taken along lines B-B of FIG. 7.
Figure 10:
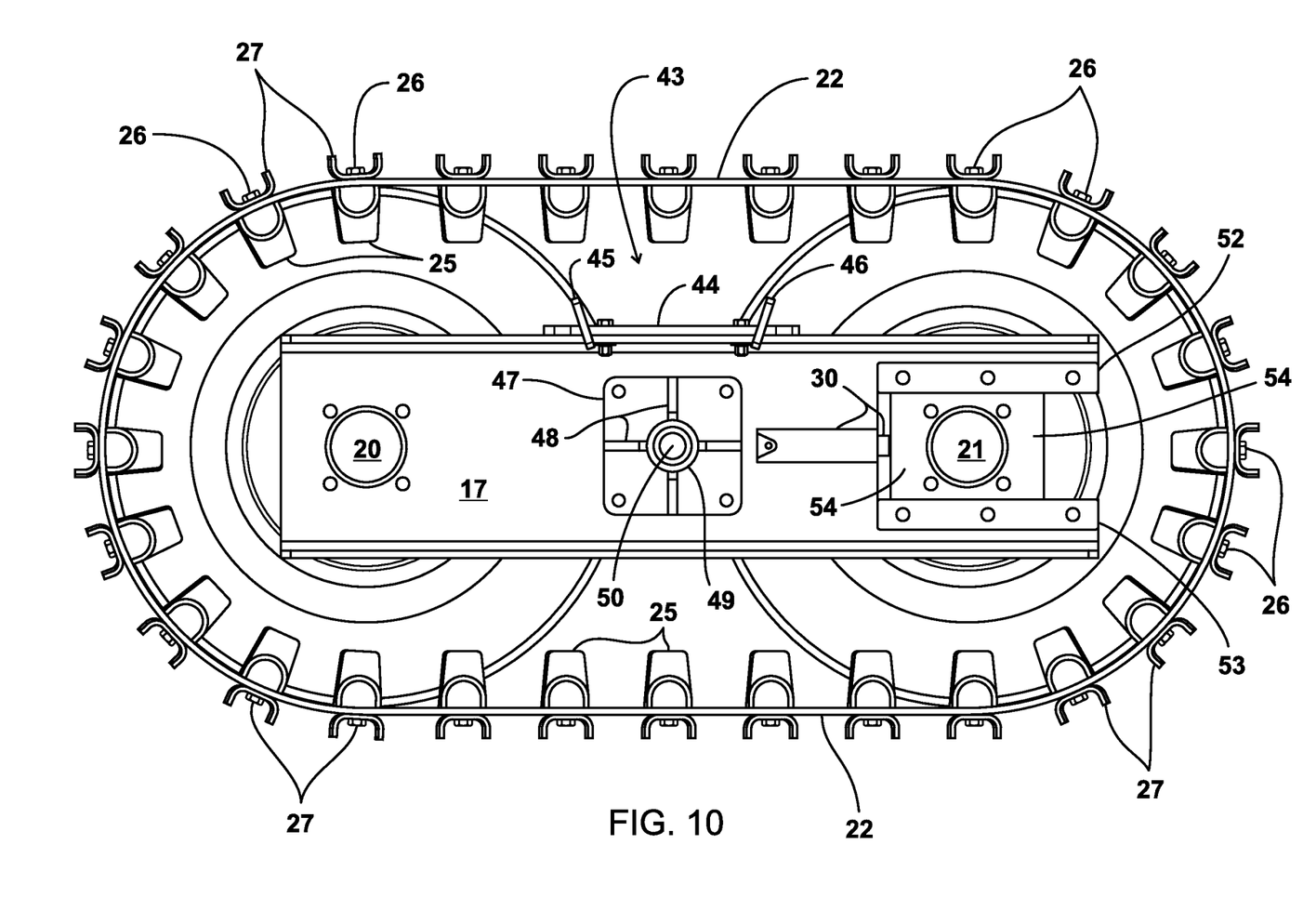
FIG. 10 is a partial side view of a preferred embodiment of the apparatus of the present invention.
Figure 11:
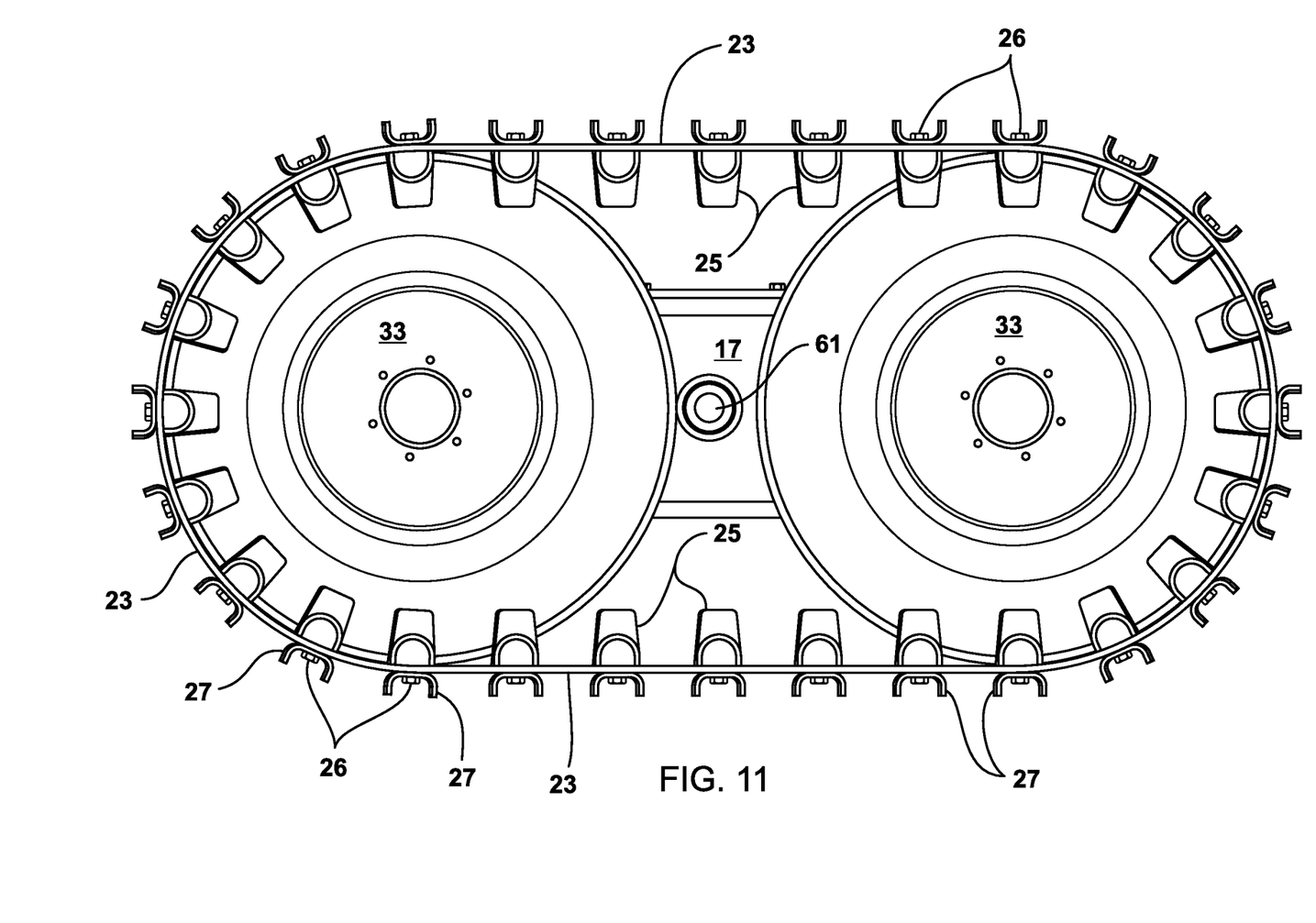
FIG. 11 is a partial side view of a preferred embodiment of the apparatus of the present invention.
Figure 12:
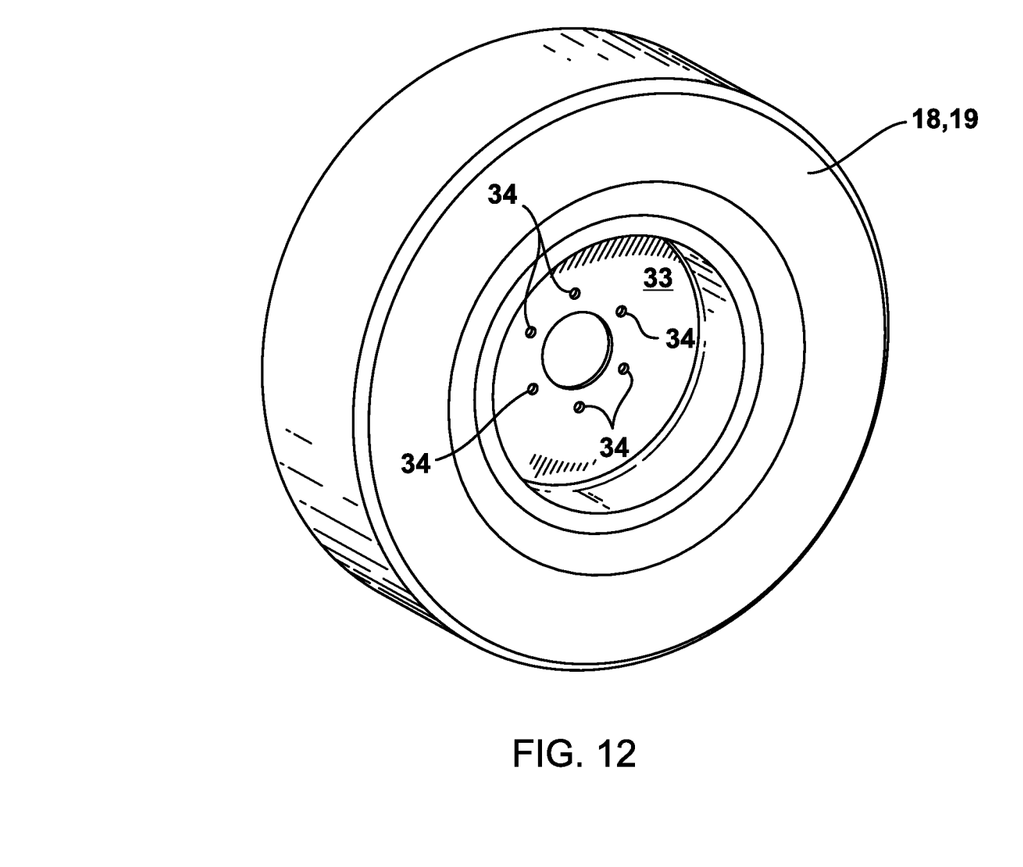
FIG. 12 is a fragmentary perspective view of a preferred embodiment of the apparatus of the present invention.
Figure 13:
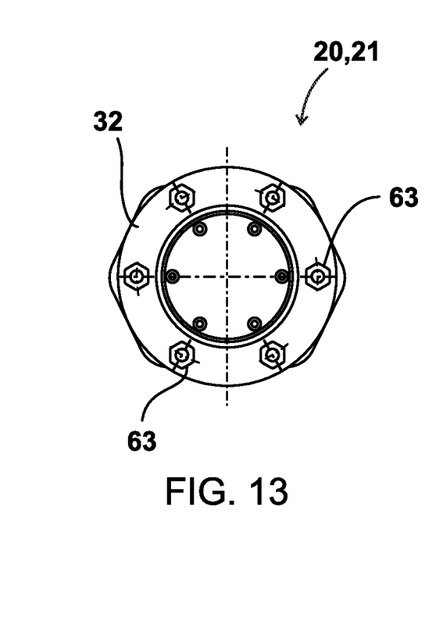
FIG. 13 is a fragmentary view of a preferred embodiment of the apparatus of the present invention showing a drive motor.
Figure 14:
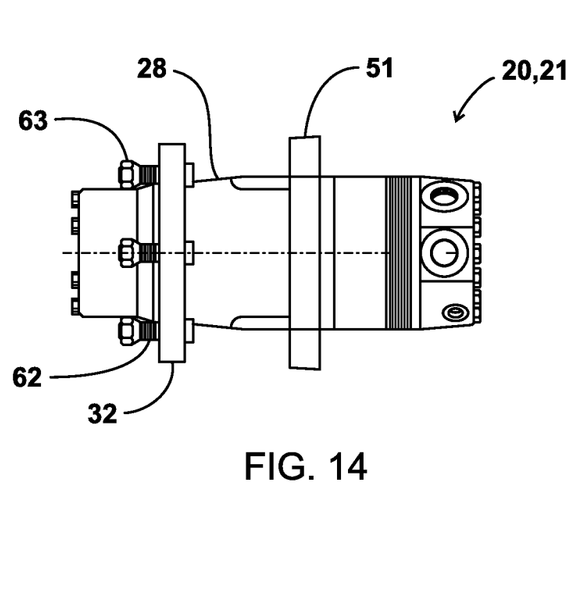
FIG. 14 is a fragmentary view of a preferred embodiment of the apparatus of the present invention showing a drive motor.
Figure 15:
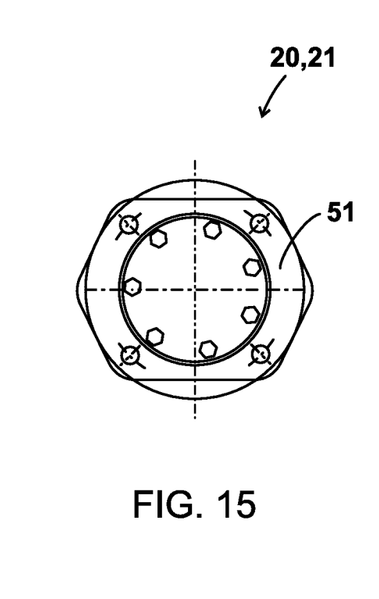
FIG. 15 is a fragmentary view of a preferred embodiment of the apparatus of the present invention showing a drive motor.
Figure 16:
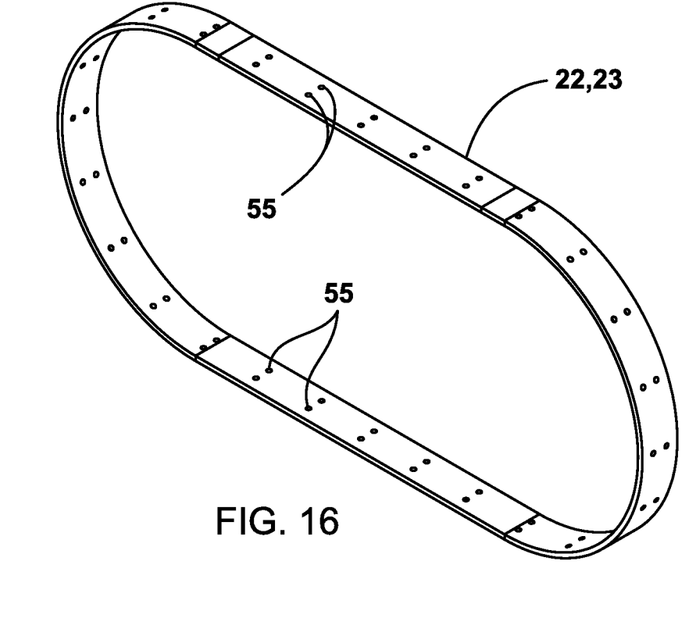
FIG. 16 is a fragmentary perspective view of a preferred embodiment of the apparatus of the present invention showing the belt.
Figure 17:
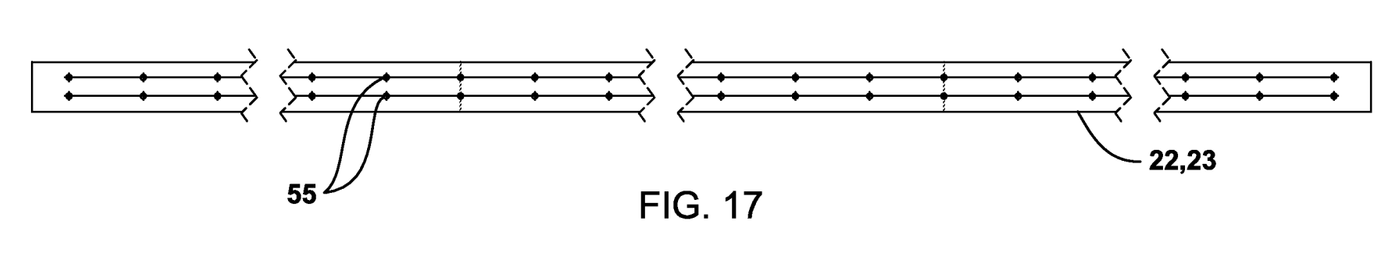
FIG. 17 is a fragmentary view of a preferred embodiment of the apparatus of the present invention showing the belt.
Figure 18:
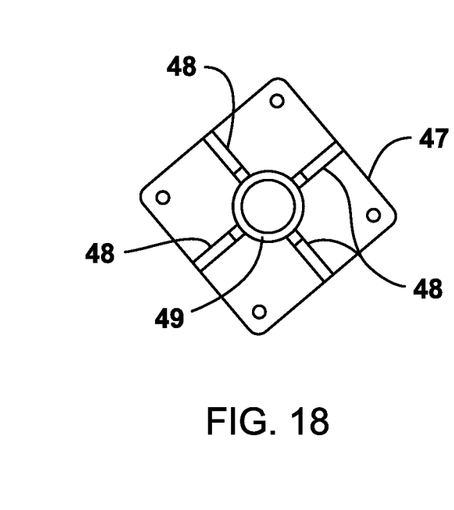
FIG. 18 is a fragmentary view of a preferred embodiment of the apparatus of the present invention showing the pivot plate.
Figure 19:
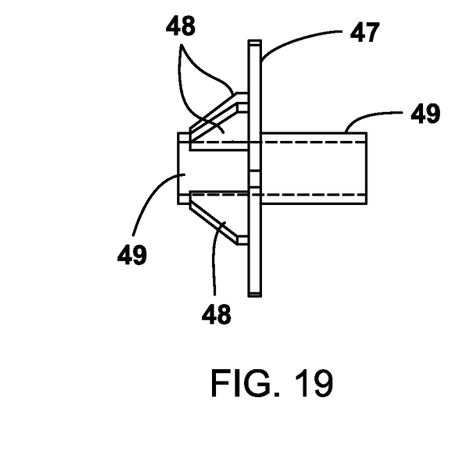
FIG. 19 is a fragmentary view of a preferred embodiment of the apparatus of the present invention showing the pivot plate.
Figure 20:
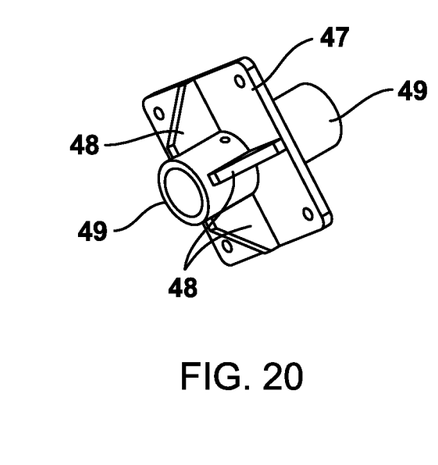
FIG. 20 is a fragmentary view of a preferred embodiment of the apparatus of the present invention showing the pivot plate.

A tilt stop 43 is preferably attached to frame 15, as shown in FIGS. 1, 7, and 10. Tilt stop 43 preferably includes tilt stop horizontal plate 44, which is preferably bolted to horizontal frame section 17, and two tilt stop inclined plates 45, 46 spaced apart on opposite sides of tilt stop horizontal plate and vertical frame section 16. Tilt stop 43 prevents vertical frame section 16 from tilting past tilt stop inclined plates 45, 46.

Frame section 17 preferably carries a pair of drive motors 20, 21. As can be seen in FIGS. 1-12, the drive motors 20, 21 can be spaced apart and can be on opposing sides of post or vertical frame section 16. In one embodiment, an idler bearing can be used instead of a motor for one of the wheels.

Drive motors 20, 21 can be commercially available hydraulic drive motors such as Model No. DT (740 Series) from White Drive Products. Each drive motor 20, 21 drives (rotates) flange 32 that connects to a wheel 18 or 19. Motor drive flange 32 connects (e.g., bolted connection) with a drive wheel 18 or 19. Drive wheel 18 is driven with drive motor 20. Drive wheel 19 is driven by drive motor 21. The drive wheel (e.g., rubber tire) 18, 19 can be mounted on a steel rim 33 with a hole pattern 34 (e.g., 6 hole pattern) to mount to the threaded studs or shafts 62 on motor flange 32 using nuts 63 (see FIGS. 5-12).

Figure 21:
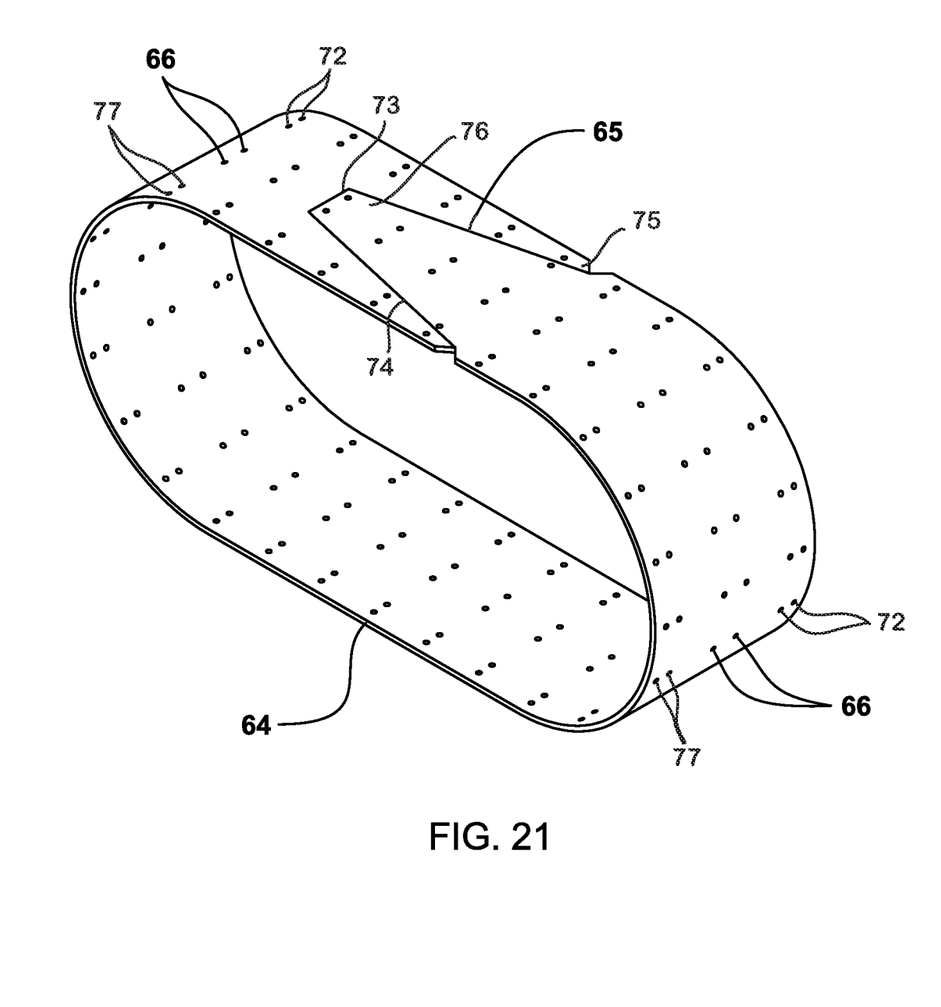
FIG. 21 is a fragmentary perspective view of a preferred embodiment of the apparatus of the present invention showing an alternate belt arrangement.

Drive motor 20 preferably mounts to the main frame 15 at frame section 17 using bolted connections (e.g., four (4) bolts). Drive motor 21 preferably mounts to sliding plate 54. The rubber wheels 18, 19 run between the belts 22, 23 and ride on the (e.g., steel) cleats 27 which can be preferably U-channel cleats. The one or more belts, tracks or endless belts 22, 23 encircle and frictionally engage the two wheels 18, 19 as shown in FIGS. 3-4, 6-11 and 17. In FIGS. 1-6, there are two laterally spaced apart drive belts, tracks or endless belts 22, 23. However, only a single wide belt 22 could be provided. In FIG. 21, a single wide belt 64 can be provided with a seam/seam edges at 65, 73, 74. Belt 64 can be provided with two belt ends 75, 76, and wherein the belt ends 75, 76 abut. Belt 64 has multiple pairs of openings 66, 72, 77. In FIG. 21, three pairs of openings 66, 72, 77 include a pair 72, 77 on each side and a pair 66 in the middle. Flexco elevator bolts can be used at openings 66, 72, 77 to connect the cleat 27 to the belt 64. The flat head of the elevator bolt would be located on the inside surface of the belt 64 while a nut preferably attaches the elevator bolt to the cleat 27. Guide lugs or lugs 24, 25 are provided, preferably attached to belt or belts 22, 23 or 64 and positioned on opposing sides of wheels 18, 19 as seen in FIGS. 1-3 and 7-9. In FIG. 3, the guide lug (or lugs) 24 is next to drive motor 20 or 21. Guide lug (or lugs) 25 is opposite drive motor 20 or 21.

A bolted connection, bolt, fastener or rivet 26 is used to fasten cleats 27 to belt or belts 22, 23 at belt opening 55 as seen in FIGS. 3, 7-9, and 16-17. Each bolt passes through a cleat 27, a belt 22 or 23 at an opening 55 and connects with a guide lug 24 or 25 as seen in FIGS. 4-9. In an alternative embodiment, the track can be a one piece molded unit that includes an endless belt or belts 22, 23 cleats 27 and lugs 24, 25. Such a one piece track could be molded of polymeric material such as molded rubber or polyurethane. In either embodiment (one piece track/lug/cleat or bolted arrangement wherein cleats 27 and lugs 24, 25 are bolted to belt or belts 22, 23 with bolted connections/rivets 26) if one belt, wheels 18, 19 frictionally engage the belt. If there are two (2) belts 22, 23 (e.g., see FIG. 3) the wheels 18, 19 frictionally engage the cleats 27.

In FIGS. 4-9, a track tensioner 30 is shown which tensions drive wheel 18 with respect to the other drive wheel 19. The track tensioner 30 can be adjusted as shown by arrow 31 in FIG. 4 to increase or decrease the pressure of one wheel 19 with respect to the other wheel 18 and thus increase or decrease tension on the belt 22 or 23. As shown in FIG. 10, the track tensioner 30 causes sliding motor mount plate 54 to slide between rails/guides 52, 53 to increase or decrease the tension on belt 22 or 23. The track tensioner 30 can use a hydraulic or grease operated take up cylinder or adjustment bolts.

Figure 5:
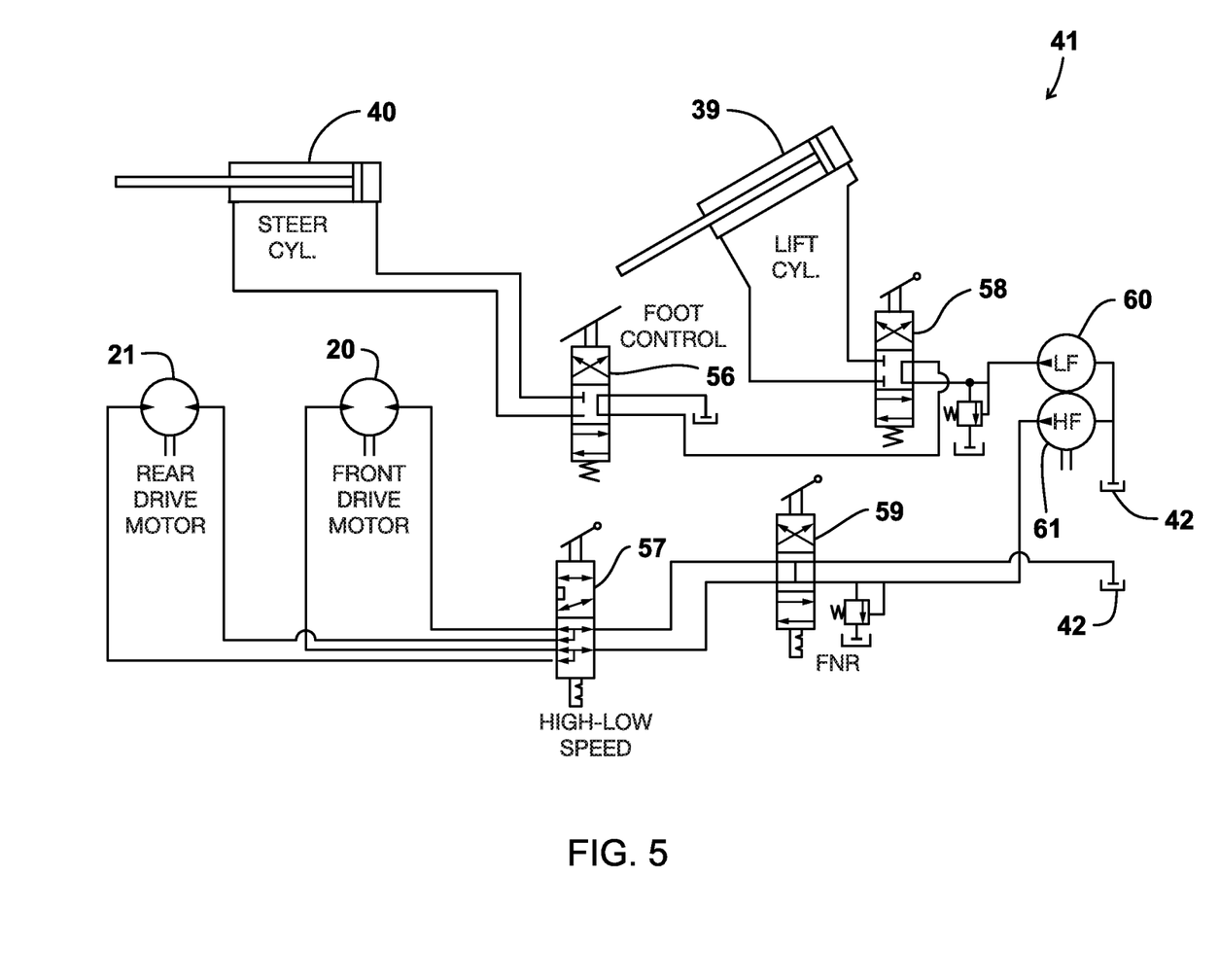
FIG. 5 is a fragmentary flow diagram view of a preferred embodiment of the apparatus of the present invention.
Figure 6:
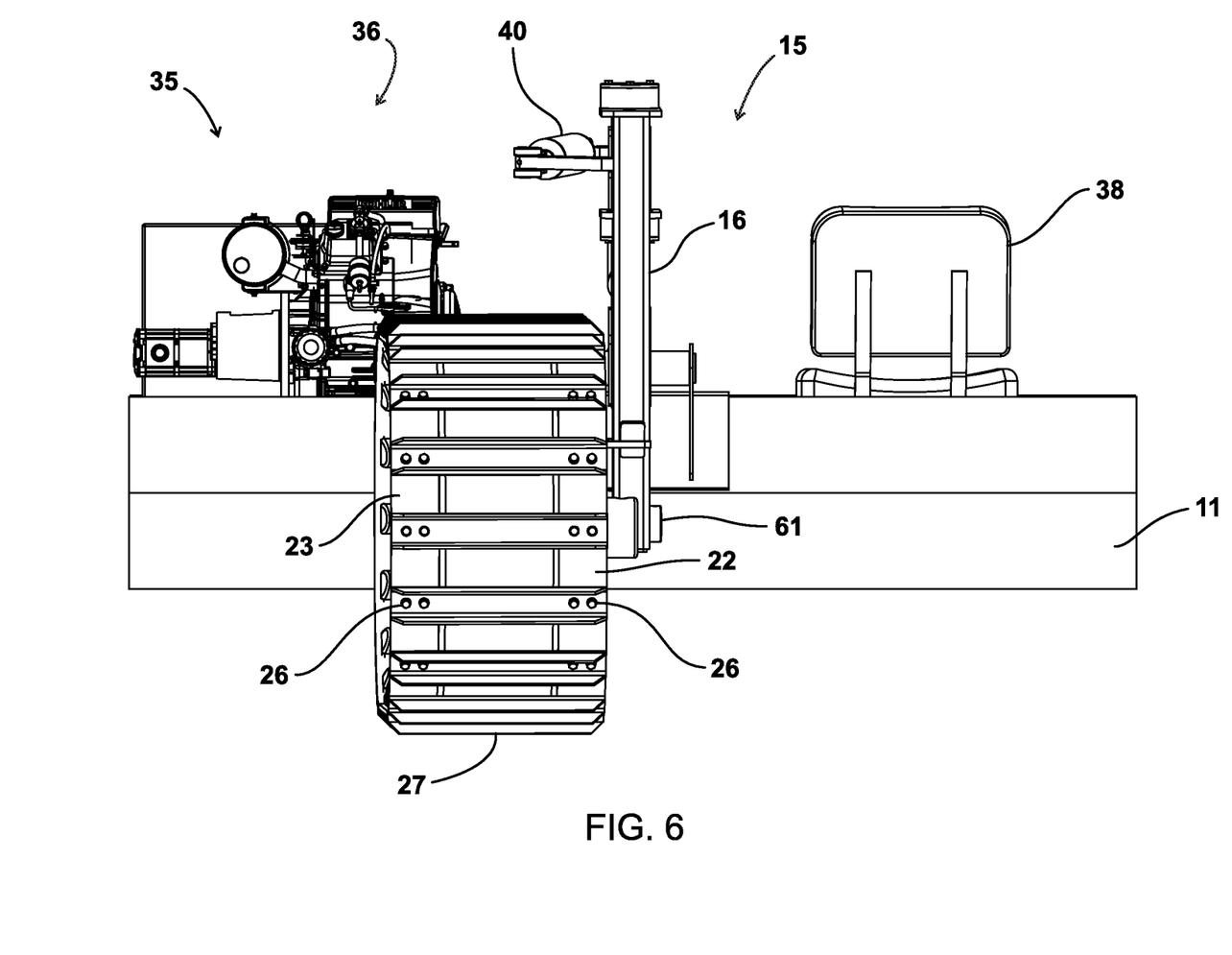
FIG. 6 is a rear view of a preferred embodiment of the apparatus of the present invention.

A hydraulic system 41, shown in FIG. 5, is used to operate lift cylinder 39, steering cylinder 40, and forward propulsion. Steering cylinder 40 can be operated with control valve or foot control 56. Steering can thus be controlled with a user's feet. Lift cylinder 39 can be controlled with manual control valve 58. There are two pumps, each driven by engine 36. Pump 60 is a low flow pump that supplies hydraulic fluid to operate lift cylinder 39 and steering cylinder 40. Control valve 58 operates lift cylinder 39 to raise or lower arm 13. Control valve 56 is a foot controlled valve to steer by extending or retracting cylinder 40. High flow pump 61 supplies hydraulic fluid to drive motors 20, 21. Valve 59 enables forward, reverse or neutral operation of the motors 20, 21 (and thus the tracks/belts (with lugs, cleats and bolted connections)). Valve 57 enables a shift from parallel flow to series flow. Parallel flow supplies flow to both motors 20, 21 for low speed operation. In series flow is for high speed operation where fluid flows first to one motor and then to the other.

The apparatus 10 of the present invention can be operated at high speed or low speed in forward or in reverse using valve 57. Valves 56, 57, 58, 59 are commercially available control valves such as Brand Hydraulics valves (www.brand-hyd.com).

Figure 22:
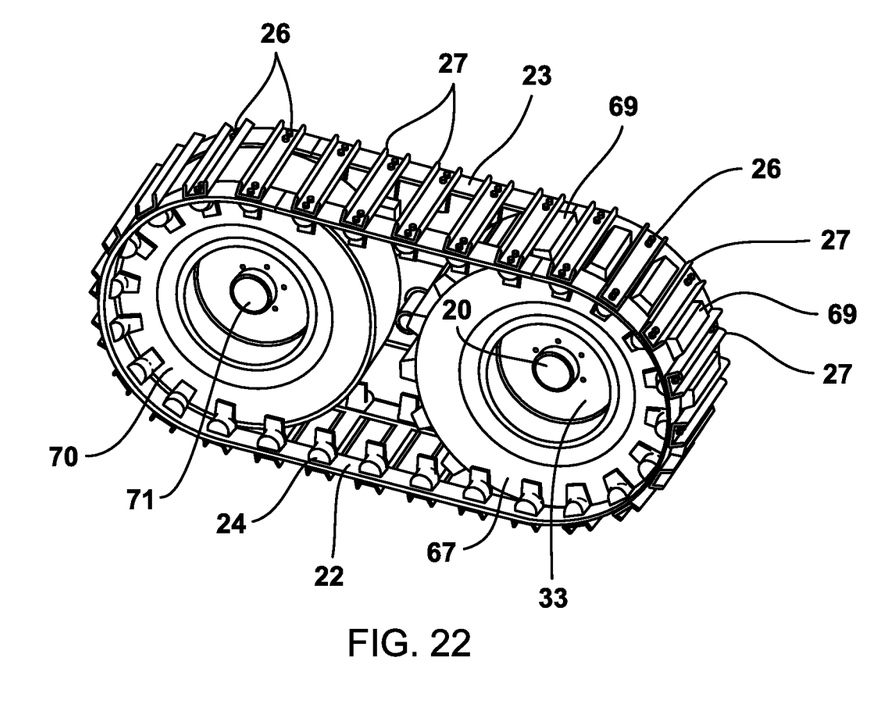
FIG. 22 is a fragmentary view of a preferred embodiment of the apparatus of the present invention showing an alternate wheel arrangement.
Figure 23:
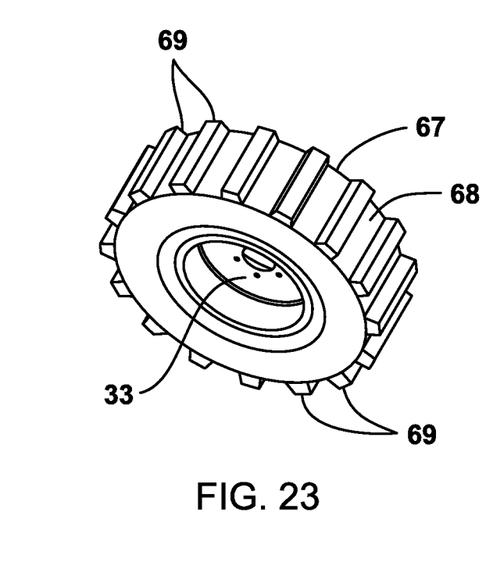
FIG. 23 is a fragmentary view of a preferred embodiment of the apparatus of the present invention showing and alternate wheel arrangement.

FIG. 22-23 show an alternate drive wheel 67 that can be used to drive the apparatus 10 by engaging cleats 27 while fitting in between belts 22, 23. Wheel 67 can provide a rim 33 (e.g., steel rim). Tire (e.g., rubber tire) 68 can be mounted on rim 33. Wheel 67 can be driven by drive motor 20. Wheel 70 can be an idler wheel. Wheel 70 can thus be mounted to an idler bearing 71. Alternatively, two driven wheels 67 can be provided wherein there is no idler wheel 70. Tire 68 has lugs 69. Each lug 69 preferably fits in between two (2) adjacent cleats 27 as seen in FIG. 22. Drive wheel 67 can be of molded rubber, molded plastic, all steel or a combination of steel and rubber or plastic. As with the embodiments of FIGS. 1-21, belts 22, 23 are preferably connected to cleats 27 and guide lugs 24, 25 using bolted connections 26, rivets or elevator bolts (e.g., Flexco elevator bolts).

The following is a list of parts and materials suitable for use in the present invention:

PARTS LIST

| PART NUMBER | DESCRIPTION |
| --- | --- |
| 10 | crayfish/crawfish harvesting apparatus |
| 11 | boat/hull/float |
| 12 | connecting end portion/connection |
| 13 | arm |
| 14 | connection/bearing/pivot assembly |
| 15 | frame |
| 16 | post/vertical frame section |
| 17 | horizontally extending frame section/motor mount frame section |
| 18 | drive wheel |
| 19 | drive wheel |
| 20 | drive motor |
| 21 | drive motor |
| 22 | belt/track/endless belt |
| 23 | belt/track/endless belt |
| 24 | guide lug/lug |
| 25 | guide lug/lug |
| 26 | bolt/fastener/bolted connection/rivet |
| 27 | cleats |
| 28 | motor bearing housing |
| 29 | bearing/pivot |
| 30 | track tensioner/cylinder and piston |
| 31 | arrow |
| 32 | motor drive flange |
| 33 | rim |
| 34 | hole pattern |
| 35 | hydraulic gear pump |
| 36 | engine |
| 37 | hydraulic control valves |
| 38 | driver's seat |
| 39 | hydraulic lift cylinder |
| 40 | hydraulic steer cylinder |
| 41 | hydraulic system |
| 42 | hydraulic oil reservoir |
| 43 | tilt stop |
| 44 | tilt stop horizontal plate |
| 45 | tilt stop inclined plate |
| 46 | tilt stop inclined plate |
| 47 | pivot plate |
| 48 | gusset/stiffener plate |
| 49 | tubular member |
| 50 | bore |
| 51 | mounting flange/plate |
| 52 | rail/guide |
| 53 | rail/guide |
| 54 | sliding motor mount plate |
| 55 | belt opening |
| 56 | control valve |
| 57 | control valve |
| 58 | control valve |
| 59 | high flow pump |
| 60 | low flow pump |
| 61 | pivot shaft |
| 62 | threaded shaft/stud |
| 63 | lug nut |
| 64 | belt |
| 65 | seam/seam edge |
| 66 | center belt holes/openings |
| 67 | wheel/drive wheel |
| 68 | tire |
| 69 | lug |
| 70 | idler wheel |
| 71 | idler bearing |
| 72 | side belt holes/openings |
| 73 | seam/seam edge |
| 74 | seam/seam edge |
| 75 | belt end |
| 76 | belt end |
| 77 | side belt holes/openings |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A crayfish/crawfish harvesting apparatus comprising:
   a) a floating hull;
   b) a track frame;
   c) a connector that joins the track frame to the hull;
   d) first and second wheels driven by one or more drive motors, said one or more motors attached to the track frame and each having a drive shaft attached to a said drive wheel;
   e) each said drive wheel having an outer belt engaging surface;
   f) an endless belt that encircles the drive wheels, engaging the belt engaging surface of both said drive wheels;
   g) a belt tensioner that urges the wheels apart so that the wheels frictionally engage the endless belt;
   h) lugs that maintain alignment of the track frame on the wheels;
   i) cleats fastened to the belt; and
   j) wherein said connector attaches to said track frame in between said first and second wheels.

2. The crayfish/crawfish harvesting apparatus of claim 1 wherein the endless belt encircles the wheels to follow an oval.

3. The crayfish/crawfish harvesting apparatus of claim 1 wherein each said cleat is fastened to the belt and to multiple said lugs.

4. The crayfish/crawfish harvesting apparatus of claim 1 wherein each said cleat is fastened to one said lug on one side of a said wheel and to another said lug on the opposite side of the wheel.

5. The crayfish/crawfish harvesting apparatus of claim 1 wherein each cleat is attached to both the belt and a said lug using a fastener that contacts the cleat, the belt and the lug.

6. The crayfish/crawfish harvesting apparatus of claim 1 wherein each said motor is hydraulically powered.

7. The crayfish/crawfish harvesting apparatus of claim 1 wherein each said drive motor is mounted to the track frame.

8. The crayfish/crawfish harvesting apparatus of claim 1 wherein said drive wheel outer belt engaging surface is generally cylindrically shaped.

9. The crayfish/crawfish harvesting apparatus of claim 1 wherein the belt tensioner includes an extendable hydraulic cylinder.

10. The crayfish/crawfish harvesting apparatus of claim 1 wherein the belt tensioner includes adjustment bolts that can be rotated to vary a distance between the drive wheels.

11. The crayfish/crawfish harvesting apparatus of claim 1 wherein said one or more drive motors including first and second drive motors.

12. The crayfish/crawfish harvesting apparatus of claim 1 wherein the wheels frictionally engage the belt.

13. The crayfish/crawfish harvesting apparatus of claim 1 wherein a controller enables the forward speed be doubled.

14. The crayfish/crawfish harvesting apparatus of claim 1 wherein one of said wheels is driven by one drive motor and further comprising an idler bearing on said frame that supports the other said wheel.

15. The crayfish/crawfish harvesting apparatus of claim 1 wherein said lugs include drive lugs on one or both wheels have drive lugs, each said drive lug positioned in between two adjacent cleats.

16. The crayfish/crawfish harvesting apparatus of claim 1, wherein the endless belt has two belt ends and a seam wherein the belt ends abut, and wherein said cleats attach to the endless belt with three pairs of openings and three pairs of bolted connections.

17. A crayfish/crawfish harvesting apparatus comprising:
   a) a floating hull;
   b) a track frame;
   c) a connector that joins the track frame to the hull;
   d) first and second wheels driven by one or more drive motors, said one or more motors attached to the track frame and each having a drive shaft attached to a said drive wheel;
   e) each said drive wheel having an outer belt engaging surface;
   f) an endless belt that encircles the drive wheels, engaging the belt engaging surface of both said drive wheels;
   g) a belt tensioner that urges the wheels apart so that the wheels frictionally engage the endless belt;
   h) lugs that maintain alignment of the track frame on the wheels;
   i) cleats fastened to the belt; and
   j) wherein the wheels frictionally engage the cleats.

18. A crayfish/crawfish harvesting apparatus comprising:
   a) a floating hull;
   b) a track frame;
   c) a connector that joins the track frame to the hull;
   d) first and second wheels driven by one or more drive motors, said one or more motors attached to the track frame and each having a drive shaft attached to a said drive wheel;
   e) each said drive wheel having an outer belt engaging surface;
   f) an endless belt that encircles the drive wheels, engaging the belt engaging surface of both said drive wheels;
   g) a belt tensioner that urges the wheels apart so that the wheels frictionally engage the endless belt;
   h) lugs that maintain alignment of the track frame on the wheels;
   i) cleats fastened to the belt; and
   j) wherein the hull supports a high flow pump and a low flow pump and further comprising a control valve that enables selective transmission of hydraulic fluid from the high flow pump to:
      1) both the first and second drive motors in parallel, or
      2) to the first drive motor and then to the second drive motor in series.

19. A crayfish/crawfish harvesting apparatus comprising:
   a) a floating hull;
   b) a track frame;
   c) a connector that joins the track frame to the hull;
   d) a track frame including first and second wheels driven by one or more drive motors, said one or more motors attached to the track frame and each having a drive shaft attached to a said wheel;
   e) each said wheel having an outer belt engaging surface;
   f) an endless belt that encircles the wheels, engaging the belt engaging surface of both said wheels;
   g) wherein the wheels frictionally engage the endless belt;
   h) lugs that maintain alignment of the track frame on the wheels;
   i) cleats fastened to the belt; and
   j) wherein said connector attaches to said track frame behind at least one said wheel with a movable connection that enables said first and second wheels to pivot relative to one another.

* * * * *